US011327550B2

United States Patent
Lee et al.

(10) Patent No.: US 11,327,550 B2
(45) Date of Patent: *May 10, 2022

(54) SENSOR CHIP WITH REDUCED OPERATION POWER

(71) Applicant: PixArt Imaging Inc., Hsin-Chu County (TW)

(72) Inventors: Joon-Chok Lee, Penang (MY); Kevin Len-Li Lim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 56 days.

This patent is subject to a terminal disclaimer.

(21) Appl. No.: 16/991,255

(22) Filed: Aug. 12, 2020

(65) Prior Publication Data

US 2020/0371580 A1    Nov. 26, 2020

Related U.S. Application Data

(63) Continuation of application No. 16/171,485, filed on Oct. 26, 2018, now Pat. No. 10,775,868.

(51) Int. Cl.
| | |
|---|---|
| *G06F 1/3234* | (2019.01) |
| *H04N 5/235* | (2006.01) |
| *H04N 5/3745* | (2011.01) |
| *H04N 5/357* | (2011.01) |
| *G06F 3/0354* | (2013.01) |

(Continued)

(52) U.S. Cl.
CPC ............ *G06F 1/3259* (2013.01); *G06F 3/038* (2013.01); *G06F 3/0354* (2013.01); *H04N 5/2353* (2013.01); *H04N 5/357* (2013.01); *H04N 5/3745* (2013.01); *G06F 3/0317* (2013.01); *G06F 3/03543* (2013.01)

(58) Field of Classification Search
CPC ...... G06F 1/3259; G06F 3/0354; G06F 3/038; G06F 3/0317; G06F 3/03543; H04N 5/2353; H04N 5/357; H04N 5/3745; H04N 5/23229; H04N 5/378; H04N 5/23241; H04N 5/351; Y02D 10/00; G01C 21/00; G06T 2207/30168
See application file for complete search history.

(56) References Cited

U.S. PATENT DOCUMENTS

| | | | |
|---|---|---|---|
| 9,288,369 B2 * | 3/2016 | Chen | ...... H04N 5/145 |
| 2006/0132443 A1 * | 6/2006 | Chien Wu | ...... G06F 3/0317 |
| | | | 345/166 |

(Continued)

FOREIGN PATENT DOCUMENTS

CN    104008522 A    8/2014

*Primary Examiner* — Shahbaz Nazrul
(74) *Attorney, Agent, or Firm* — WPAT, PC (57) ABSTRACT

There is provided a navigation device including an image sensor, an analog to digital converter and a processor. The image sensor is used to output an analog image using an exposure time. The analog to digital converter is used to convert the analog image to a digital image using a resolution. The processor is used to identify an image quality of the digital image, and adjust at least one of the exposure time of the image sensor and the resolution of the analog to digital converter according to the image quality thereby adjusting the operation power by changing data length actually processed by the processor.

14 Claims, 4 Drawing Sheets

(51) Int. Cl.
*G06F 3/038* (2013.01)
*G06F 3/03* (2006.01)

(56) References Cited

U.S. PATENT DOCUMENTS

| | | | | |
|---|---|---|---|---|
| 2009/0160774 | A1* | 6/2009 | Lee | G06F 3/03543 |
| | | | | 345/166 |
| 2013/0249800 | A1* | 9/2013 | Chung | G06F 3/03543 |
| | | | | 345/166 |
| 2013/0301880 | A1* | 11/2013 | Chen | G06F 3/0383 |
| | | | | 382/103 |
| 2014/0028868 | A1* | 1/2014 | Huang | G01B 11/02 |
| | | | | 348/222.1 |
| 2014/0210722 | A1* | 7/2014 | Chen | G06F 3/0317 |
| | | | | 345/166 |
| 2014/0292657 | A1* | 10/2014 | Chen | G06F 3/0383 |
| | | | | 345/166 |
| 2018/0364818 | A1* | 12/2018 | Tan | G06F 3/0317 |
| 2019/0033992 | A1* | 1/2019 | Morier | G06F 3/0304 |

* cited by examiner

SENSOR CHIP WITH REDUCED OPERATION POWER

CROSS REFERENCE TO RELATED APPLICATION

The present application is a continuation application of U.S. Ser. No. 16/171,485, filed on Oct. 26, 2018, the disclosure of which is hereby incorporated by reference herein in its entirety.

BACKGROUND

1. Field of the Disclosure

This disclosure generally relates to a navigation device and, more particularly, to a navigation device that reduces the power consumption by decreasing a bit length of each digital data actually processed by a processor.

2. Description of the Related Art

Although the touch panel has become a new choice of the human-machine interface, the navigation device is still necessary for interacting with an image display device in some scenarios.

Reducing the power consumption of a navigation device is always an issue in the development of the navigation device. Especially for a wireless navigation device, the consuming power of every component therein should be decreased as much as possible.

One popular way is to control a navigation device to enter a sleep mode or a standby mode to reduce the consuming power when the navigation device is not operated for a predetermined time interval. However, it is not enough to prolong the battery endurance by saving power only within a time interval that the device is not being operated, but preferably the device has a low consuming power during operation.

Accordingly, the present disclosure provides a navigation device that reduces a bit length of each digital data processed by a processor during an operating interval according to image quality of a digital image so as to reduce computation of the processor thereby decreasing the total consuming power.

SUMMARY

The present disclosure provides a navigation device that changes a conversion resolution of an analog to digital converter (ADC) according to an image quality of a digital image to adjust a bit length calculated by a processor to accordingly reduce the total power consumption while operating with respect to a high quality work surface.

The present disclosure further provides a navigation device that changes an exposure time of an image sensor according to an image quality of a digital image to adjust a bit length calculated by a processor to accordingly reduce the total power consumption while operating with respect to a high quality work surface.

The present disclosure provides a sensor chip including an image sensor, an analog amplifier, an analog to digital converter and a processor. The image sensor is configured to output an image frame. The analog amplifier is configured to amplify the image frame using an adjustable gain. The analog to digital converter is configured to convert, using a conversion resolution, the amplified image frame to a digital image. The processor is configured to calculate an image quality of the digital image, select a first conversion resolution and a first gain when the image quality is smaller than a second quality threshold, and select a second conversion resolution and a second gain when the image quality is larger than a first quality threshold, wherein the first conversion resolution is higher than the second conversion resolution, the first gain is smaller than the second gain, and the first quality threshold is different from the second quality threshold.

The present disclosure further provides a sensor chip including an image sensor, an analog amplifier, an analog to digital converter and a processor. The image sensor is configured to output an image frame using an adjustable exposure time. The analog amplifier is configured to amplify the image frame using an adjustable gain. The analog to digital converter is configured to convert the amplified image frame to a digital image. The processor is configured to calculate an image quality of the digital image, select a first exposure time and a first gain when the image quality is smaller than a second quality threshold, and select a second exposure time and a second gain when the image quality is larger than a first quality threshold, wherein the first exposure time is longer than the second exposure time, the first gain is smaller than the second gain, and the first quality threshold is different from the second quality threshold.

The present disclosure further provides a sensor chip including an image sensor, an analog to digital converter and a processor. The image sensor is configured to output an image frame using an adjustable exposure time. The analog to digital converter is configured to convert, using a fixed bit length, the image frame to a digital image. The processor is configured to calculate an image quality of the digital image, select a first exposure time and process all bit data among the fixed bit length of digital data of the digital image when the image quality is smaller than a second quality threshold, and select a second exposure time and process a part of bit data among the fixed bit length of digital data of the digital image when the image quality is larger than a first quality threshold, wherein the first exposure time is longer than the second exposure time, and the first quality threshold is different from the second quality threshold.

In the navigation device of the present disclosure, when a conversion resolution of an analog to digital converter is reduced and since the gain noise is generally lower than the digitization noise, it is possible to select to increase a gain of an analog amplifier to amplify the pixel data at the same time. In addition, when the gain of the analog amplifier is increased, it is possible to shorten an exposure time of an image sensor and each emission interval of a light source at the same time to further reduce the total power consumption.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
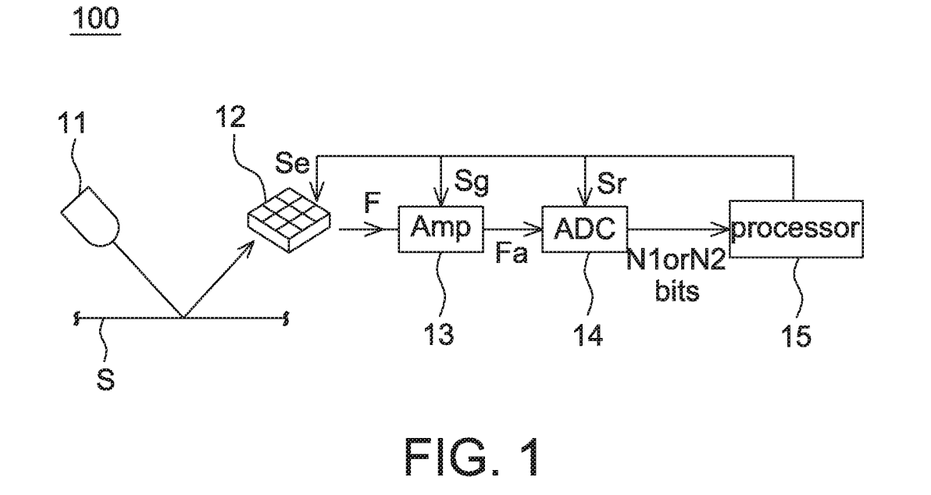
FIG. 1 is a block diagram of a navigation device according to a first embodiment of the present disclosure.

Referring to FIG. 1, it is a block diagram of a navigation device 100 according to one embodiment of the present disclosure. The navigation device 100 is used to calculate a relative motion with respect to a work surface S, wherein the relative motion is caused by the movement of at least one of the navigation device 100 and the work surface S. The navigation device 100 is, for example, an optical mouse or an optical finger navigation device, and used to calculate displacement or locus according to features in captured images.

The navigation device 100 includes an image sensor 12, an analog to digital converter (ADC) 14 and a processor 15. For example in one non-limiting embodiment, the image sensor 12, the ADC 14 and the processor 15 are manufactured as a sensor chip and encapsulated in a same package.

The image sensor 12 includes a pixel array (e.g., FIG. 1 showing the pixel array having 9 pixels) which outputs an image frame F using an exposure time, wherein the exposure time is fixed or adjustable according to different applications.

Figure 2:
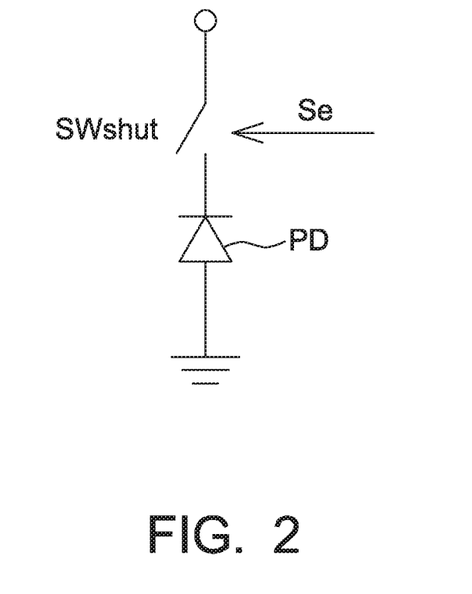
FIG. 2 is a schematic diagram of controlling the exposure time according to one embodiment of the present disclosure.

Referring to FIG. 2, it is a schematic diagram of one method for adjusting the exposure time. The pixel array of the image sensor 12 includes a plurality of pixels each including, for example, a shutter switch SWshut and at least one photodiode PD. The processor 15 controls the interval of turning on or turning off the shutter switch SWshut by sending a control signal Se so as to change the exposure time of each pixel. Each pixel of the image sensor 12 has the conventional 3 transistors (3T), 4T or 5T structure without particular limitations.

The ADC 14 is used to convert, using a conversion resolution, each pixel data of the image frame F into digital data, and the digital data of all pixels form a digital image, wherein the conversion resolution is fixed or adjustable according to different applications. The conversion resolution determines a bit length of every digital data, wherein a higher conversion resolution can obtain a higher accuracy, but a longer bit length is required and thus the processor 15 has to process more data.

The processor 15 is, for example, a digital signal processor (DSP) that is used to post-process digital data of the digital image outputted by the ADC 14, e.g., calculating displacement or tracking locus. In the present disclosure, the processor 15 is further used to calculate an image quality of the digital image, and reduce a bit length of each digital data processed by the processor 15 according to the image quality thereby reducing the consuming power.

Figure 3:
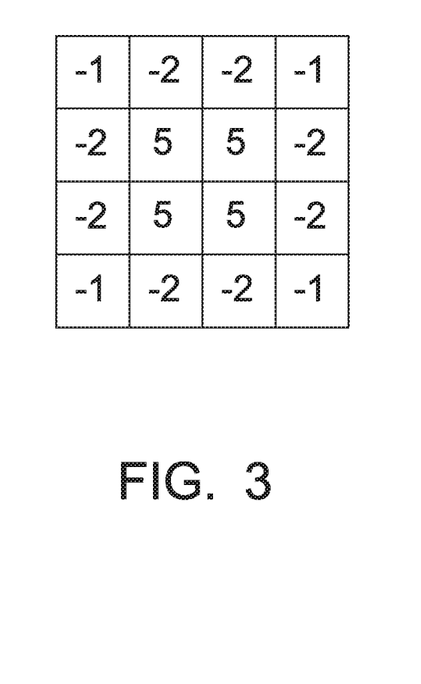
FIG. 3 is a schematic diagram of one filter kernel adaptable to a navigation device according to one embodiment of the present disclosure.

The processor 15 uses a proper method to calculate the image quality. In one non-limiting embodiment, the processor 15 uses a DC removal filter to filter the digital image at first, e.g., using a filter kernel shown in FIG. 3 to filter the digital image, to generate a filtered digital image. The processor 15 then counts a number of pixels, which have a digital value exceeding a predetermined threshold, in the filtered digital image, and takes the number of pixels as a way to determine the image quality. When the counted number of pixels is higher, it indicates that the image quality is better and means that the navigation device 100 is more suitable to be operated on a current work surface S. On the contrary, if the counted number of pixels is lower, the image quality is worse.

In other embodiments, the processor 15 counts a number of adjacent pixels, which have a pixel difference therebetween exceeding a difference threshold, in the digital image, and takes the counted number as a way to determine the image quality. If the counted number is higher, the image quality is better. In addition, it is possible to use a number of edges, contrast or other features in the digital image to indicate the image quality without particular limitations.

In the first embodiment of the present disclosure, the processor 15 is used to calculate an image quality of a digital image outputted from the ADC 14, and change a conversion resolution of the ADC 14 according to the image quality. For example, when the calculated image quality is larger than or equal to a quality threshold, the processor 15 generates a control signal Sr to the ADC 14 to reduce the conversion resolution of the ADC 14. For example, the ADC 14 samples using N1 bits (e.g., 10 bits, but not limited thereto) before the conversion resolution is reduced, and samples using N2 bits (e.g., 6 bits, but not limited thereto) after the conversion resolution is reduced, wherein N2<N1. In this way, by reducing the conversion resolution of the ADC 14, a bit length of each digital data post-processed by the processor 15 is reduced to accordingly reduce the total computation.

On the contrary, when the image quality is smaller than the quality threshold, the processor 15 increases the conversion resolution such that each sample has more bits.

Figure 4:
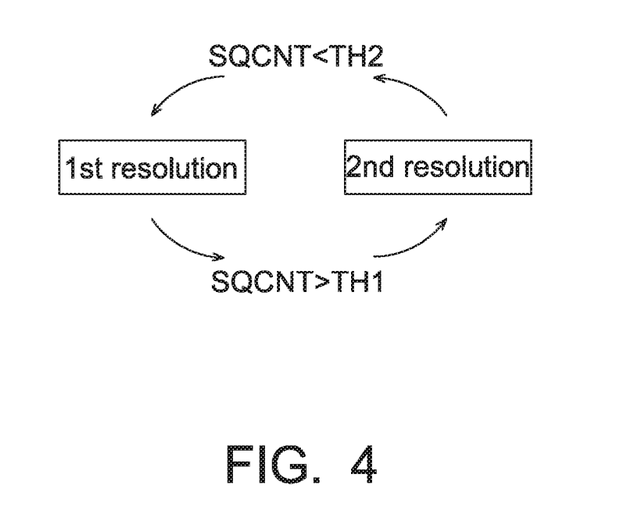
FIG. 4 is an operational schematic diagram of a navigation device according to the first embodiment of the present disclosure.

Referring to FIG. 4, it is an operational schematic diagram of a navigation device 100 according to a first embodiment of the present disclosure. The navigation device 100 operates, for example, with two modes respectively having a first resolution (e.g., 10 bits) and a second resolution (e.g., 6 bits), wherein the second resolution is selected to be lower than the first resolution in FIG. 4.

When the ADC 14 generates a digital image using a first resolution and the calculated image quality SQCNT is larger than or equal to a first quality threshold TH1, it means that a current work surface S has apparent features and the processor 15 is used to change the first resolution of the ADC 14 to a second resolution by sending a control signal Sr thereto. On the contrary, when the ADC 14 generates a digital image using the second resolution and the calculated image quality SQCNT is smaller than a second quality threshold TH2, it means that the current work surface S does not have enough features and the processor 15 is used to change the second resolution of the ADC 14 to the first resolution by sending a control signal Sr thereto. In this embodiment, the first quality threshold TH1 is preferably different from the second quality threshold TH2.

Figure 5:
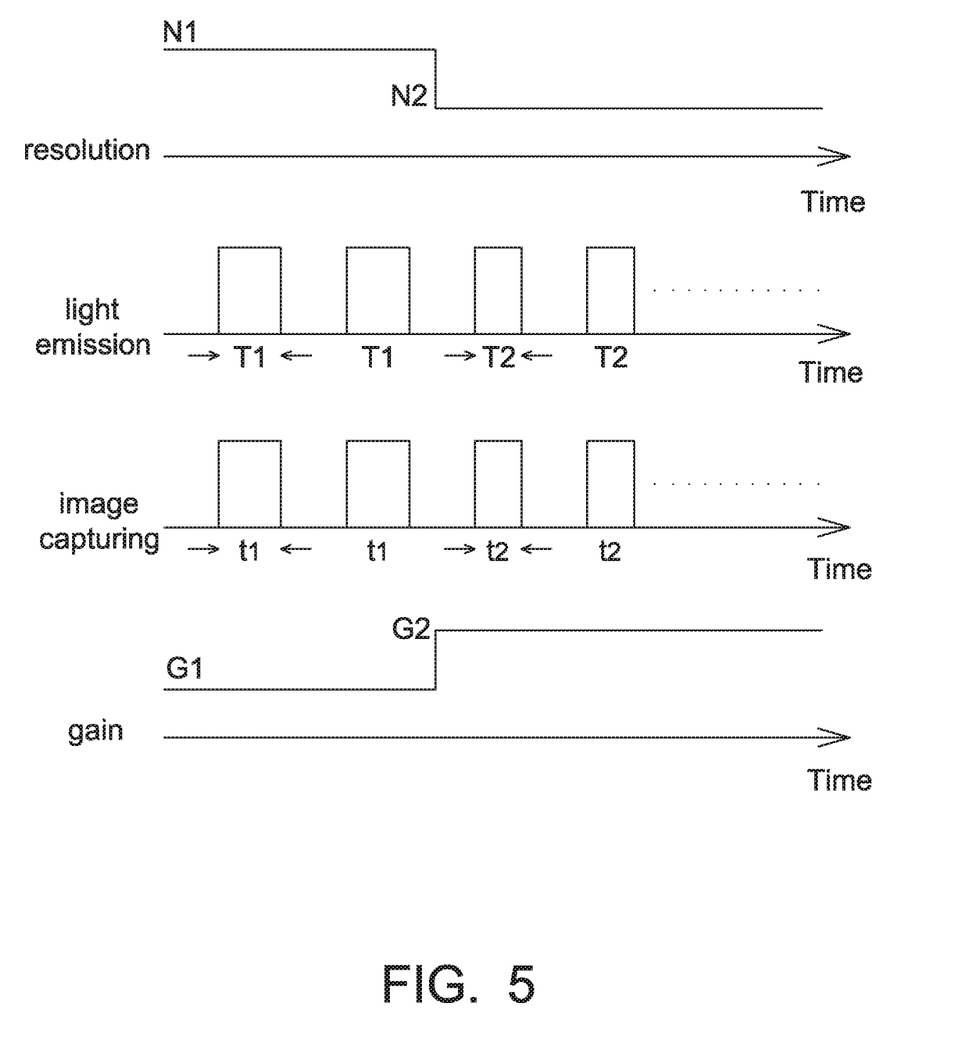
FIG. 5 is an operational timing diagram of a navigation device according to the first embodiment of the present disclosure.

Please referring to FIG. 5 together, it is an operational timing diagram of a navigation device 100 according to a first embodiment of the present disclosure. In addition to the above method, the total power consumption of the navigation device 100 in the first embodiment can further be reduced as below.

The navigation device 100 further includes an analog amplifier (e.g., PGA) 13 used to amplify each pixel data of the image frame F using a gain G to generate an amplified image frame Fa. The ADC 14 is used to convert the amplified image frame Fa into a digital image. In this embodiment, when the processor 15 controls the ADC 14 to reduce the conversion resolution and because the gain noise is generally lower than the digitization noise, the noise in a digital image generated by the ADC 14 is not significantly increased if the gain G of the analog amplifier 13 is increased at the same time. For example, the processor 15 sends a control signal Sg to control the analog amplifier 13 to change the gain G thereof.

After the gain G of the analog amplifier 13 is increased, in order to allow the maximum gray value of the digital image to be maintained at a substantially identical value, the processor 15 shortens the exposure time of the image sensor 12 at the same time. As shown in FIG. 5, when the analog amplifier 13 operates at a lower gain G1 (corresponding to a higher conversion resolution N1), the image sensor 12 captures the image frame F using an exposure time $t_1$; whereas, when the analog amplifier 13 operates at a higher gain G2 (corresponding to a lower conversion resolution N2), the image sensor 12 captures the image frame F using an exposure time $t_2$, wherein $t_2 < t_1$.

In some embodiments, the navigation device 100 further includes a light source 11, which is a light emitting diode or a laser diode for emitting coherent light, non-coherent light or partially coherent light having a predetermined spectrum, e.g., infrared light. The light source 11 is used to provide light required by the image sensor 12 for capturing the image frame F, e.g., illuminating the work surface S. Each emission interval of the light source 11 is adjustable corresponding to an exposure time of the image sensor 12 as long as it is larger than or equal to the exposure time. In one non-limiting embodiment, when the processor 15 controls, using a control signal Se, the image sensor 12 to shorten the exposure time (e.g., from $t_1$ to $t_2$ as shown in FIG. 5), the processor 15 also controls the light source 11 to shorten each emission interval (e.g., from T1 to T2 as shown in FIG. 5), wherein T1 is larger than or equal to $t_1$, and T2 is larger than or equal to $t_2$. Preferably, each emission interval of the light source 11 is maintained identical.

Figure 6:
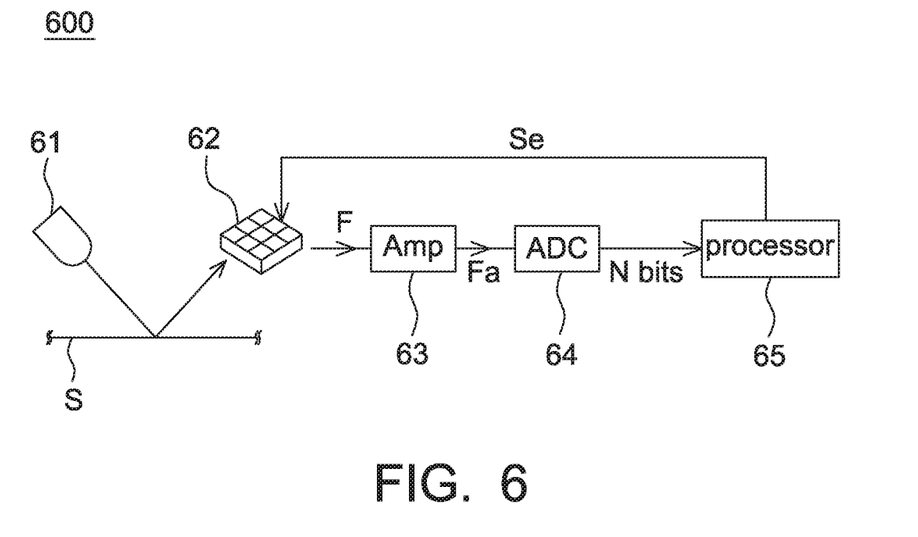
FIG. 6 is a block diagram of a navigation device according to a second embodiment of the present disclosure.

Please referring to FIG. 6, it is a block diagram of a navigation device 600 according to a second embodiment of the present disclosure. The navigation device 600 also includes a light source 61 used to provide light to be detected, an image sensor 62 having a pixel array for outputting an image frame F based on an exposure time, and an analog amplifier 63 used to amplify each pixel data of the image frame F and output an amplified image frame Fa.

The difference between the second embodiment from the first embodiment is that in the second embodiment the analog to digital converter (ADC) 64 is used to convert, using a fixed conversion resolution, each pixel data of the image frame F (or the amplified image frame Fa) to digital data having predetermined bits (e.g., N bits), and to generate a digital image. The processor 65 is used to calculate an image quality of the digital image, and changes, according to the calculated image quality, the exposure time of the image sensor 62 and a bit length among the predetermined bits of the digital data to be processed by the processor 65. In other words, the processor 65 further reduces the exposure time of the image sensor 62 when reducing the bit length among the predetermined bits of each digital data processor thereby to allow the maximum gray value of the digital data of each pixel of the digital image not to exceed a maximum range of the pixel data to be processed by the processor 65. In other words, although the conversion resolution of the ADC 64 is fixed, higher bits among the predetermined bits of the digital data is controlled not to contain information of features of a work surface S because the exposure time of the image sensor 62 is reduced.

For example, when the calculated image quality is larger than or equal to a quality threshold, the processor 65 is used to reduce the bit length processed thereby, but when the calculated image quality is smaller than the quality threshold, the processor 65 is used to increase the bit length processed thereby. It is appreciated that in this embodiment each digital data outputted by the ADC 64 has fixed multiple bits (e.g., N bits). Corresponding to a shorter exposure time, the processor 65 only processes lower bit data among the predetermined bits.

Figure 7:
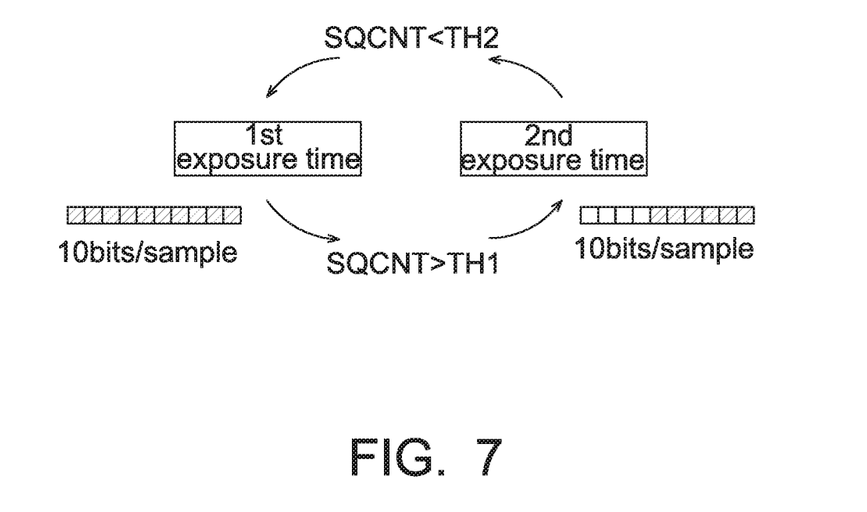
FIG. 7 is an operational schematic diagram of a navigation device according to the second embodiment of the present disclosure.

Please referring to FIG. 7, it is an operational schematic diagram of a navigation device 600 according to a second embodiment of the present disclosure, which operates with a first exposure time or a second exposure time. In this embodiment, it is one way to change the exposure time of the photodiode in each pixel using the method as FIG. 2. The image quality is also calculated using the way described above, and thus details thereof are not repeated herein.

For example, when the image sensor 62 outputs the image frame F using a first exposure time and the calculated image quality SQCNT is larger than or equal to a first quality threshold TH1, the processor 65 is used to change the first exposure time to a second exposure time, wherein the second exposure time is shorter than the first exposure time. In one non-limiting embodiment, when the calculated image quality SQCNT is larger than or equal to the first quality threshold TH1, the processor 65 processes a part of bit data (i.e. smaller than N bits) among the predetermined bits of each digital data, e.g., only processing lower bit data among the predetermined bits of the digital data without processing the rest higher bit data among the predetermined bits of the digital data, wherein a number of bits of the lower bit data and the higher bit data are previously determined according to, for example, the expected accuracy and noise immunity of the processor 65. For example, the ADC 64 is set to output digital data of 10 bits, and the processor 65 selects to process lower 6 bits of the digital data (as bits filled with slant lines in FIG. 7) without processing other higher 4 bits of the digital data (as bits not filled with slant lines in FIG. 7) if the navigation device 600 is operated corresponding to a high quality work surface S. As the exposure time of the image sensor 62 is reduced, the processor 65 determines that said rest higher bit data does not contain required information of the work surface S.

In addition, when the image sensor 62 outputs the image frame F using the second exposure time and the calculated image quality SQCNT is smaller than or equal to a second quality threshold TH2, the processor 65 is used to change the second exposure time to the first exposure time, wherein the first quality threshold TH1 is selected to be identical to or different from the second quality threshold TH2. In one non-limiting embodiment, when the calculated image quality SQCNT is smaller than or equal to the second quality threshold TH2, the processor 65 processes all bit data (i.e. N bits) among the predetermined bits of each digital data of the digital image.

Accordingly, when the navigation device 600 operates on a work surface S having high quality (determined by a comparison result between the calculated image quality and a quality threshold), the processor 65 processes fewer data amount within each frame period so as to reduce the power consumption.

In the present disclosure, although the above embodiments take the analog amplifier outside the image sensor as an example for illustration, the present disclosure is not limited thereto. In other embodiments, multiple analog amplifiers are included in the image sensor and respectively corresponding to one pixel row or one pixel column such that the image frame outputted by the image sensor is an amplified image frame.

It should be mentioned that although the above embodiments take two conversion resolutions and two exposure times as an example for illustration, the present disclosure is not limited thereto. In other embodiments, the analog to digital converter has more than two adjustable resolutions, and the image sensor has more than two adjustable exposure times. The processor adjusts itself to process digital data with multiple different bit lengths according to a comparison result of the image quality with multiple quality thresholds. In this case, the processor changes the bit lengths one step at a time, or changes multiple steps each time.

In a word, the first embodiment of the present disclosure is to achieve the purpose of reducing data amount processed by the processor by means of reducing the analog-digital conversion resolution of an analog to digital converter; whereas in the second embodiment, the processor controls the image sensor to reduce its exposure time, and the processor actively selects to process a part of the fixed bit length of the digital data outputted by the analog to digital converter to achieve the purpose of reducing data amount processed by the processor. Furthermore, shorter exposure time means that the light source (IR LED or Laser) 11 is turned on for a shorter duration, and this translates to further lowering the power consumption of the navigation device.

It is appreciated that values used in above embodiments of the present disclosure such as the pixel number, bit length, values in the filter kernel, are only intended to illustrate but not to limit the present disclosure.

As mentioned above, in addition to saving power in the sleep mode or standby mode, a navigation device is required to reduce the operation power of every component as much as possible during operation. Accordingly, the present disclosure further provides a navigation device (e.g., FIGS. 1 and 6) and an operating method thereof (e.g. FIGS. 4-5 and 7) that adjust the data amount processed by a processor within each frame period according to the image quality to achieve purposes of reducing the power consumption.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A sensor chip, comprising:
   an image sensor configured to output an image frame;
   an analog amplifier configured to amplify the image frame using an adjustable gain;
   an analog to digital converter configured to convert, using a conversion resolution, the amplified image frame to a digital image; and
   a processor configured to
     calculate an image quality of the digital image,
     select a first conversion resolution and a first gain when the image quality is smaller than a second quality threshold, and
     select a second conversion resolution and a second gain when the image quality is larger than a first quality threshold,
     wherein the first conversion resolution is higher than the second conversion resolution, the first gain is smaller than the second gain, and the first quality threshold is different from the second quality threshold.

2. The sensor chip as claimed in claim 1, wherein the processor is further configured to
   select a first exposure time of the image sensor when the image quality is smaller than the second quality threshold, and
   select a second exposure time, shorter than the first exposure time, of the image sensor when the image quality is larger than the first quality threshold.

3. The sensor chip as claimed in claim 2, wherein a maximum gray value of the digital image is fixed either selecting the first exposure time in combination with the first gain or selecting the second exposure time in combination with the second gain.

4. The sensor chip as claimed in claim 2, wherein the processor is further configured to
   select a first emission interval of a light source when the first exposure time is selected, and
   select a second emission interval, shorter than the first emission interval, of the light source when the second exposure time is selected.

5. A sensor chip, comprising:
   an image sensor configured to output an image frame using an adjustable exposure time;
   an analog amplifier configured to amplify the image frame using an adjustable gain;
   an analog to digital converter configured to convert the amplified image frame to a digital image; and
   a processor configured to
     calculate an image quality of the digital image,
     select a first exposure time and a first gain when the image quality is smaller than a second quality threshold, and
     select a second exposure time and a second gain when the image quality is larger than a first quality threshold,
     wherein the first exposure time is longer than the second exposure time, the first gain is smaller than the second gain, and the first quality threshold is different from the second quality threshold.

6. The sensor chip as claimed in claim 5, wherein a maximum gray value of the digital image is fixed either selecting the first exposure time in combination with the first gain or selecting the second exposure time in combination with the second gain.

7. The sensor chip as claimed in claim 5, wherein the processor is further configured to
   select a first emission interval of a light source when the first exposure time is selected, and
   select a second emission interval, shorter than the first emission interval, of the light source when the second exposure time is selected.

8. The sensor chip as claimed in claim 5, wherein the analog to digital converter is configured to convert the amplified image frame to the digital image using a fixed bit length, and the processor is further configured to
   process a first bit length among the fixed bit length of digital data of the digital image when the first exposure time is selected, and process a second bit length, smaller than the first bit length, among the fixed bit length of digital data of the digital image when the second exposure time is selected.

9. The sensor chip as claimed in claim 8, wherein the second bit length is lower bit data among the fixed bit length of digital data of the digital image.

10. A sensor chip, comprising:
an image sensor configured to output an image frame using an adjustable exposure time;
an analog to digital converter configured to convert, using a fixed bit length, the image frame to a digital image; and
a processor configured to
calculate an image quality of the digital image,
select a first exposure time and process all bit data among the fixed bit length of digital data of the digital image when the image quality is smaller than a second quality threshold, and
select a second exposure time and process a part of bit data among the fixed bit length of digital data of the digital image when the image quality is larger than a first quality threshold,
wherein the first exposure time is longer than the second exposure time, and the first quality threshold is different from the second quality threshold.

11. The sensor chip as claimed in claim 10, wherein the part of bit data is lower bit data among the fixed bit length of digital data of the digital image.

12. The sensor chip as claimed in claim 10, wherein the processor is further configured to
select a first emission interval of a light source when the first exposure time is selected, and
select a second emission interval, shorter than the first emission interval, of the light source when the second exposure time is selected.

13. The sensor chip as claimed in claim 10, wherein the processor is further configured to
select a first gain when the first exposure time is selected, and
select a second gain, larger than the first gain, when the second exposure time is selected.

14. The sensor chip as claimed in claim 13, wherein a maximum gray value of the digital image is fixed either selecting the first exposure time in combination with the first gain or selecting the second exposure time in combination with the second gain.

* * * * *